United States Patent Office 3,471,427
Patented Oct. 7, 1969

3,471,427
STABILIZED POLYOLEFIN COMPOSITIONS
David M. Dickson, Jr., Wilmington, Del., assignor to Hercules Incorporated, Wilmington, Del., a corporation of Delaware
No Drawing. Filed Apr. 4, 1958, Ser. No. 726,304
Int. Cl. C08f 45/58
U.S. Cl. 260—23
19 Claims This invention relates to polyolefin compositions and more particularly to the stabilization of polypropylene and polymers of higher α-olefins against degradation by heat and light.

High molecular weight polymers of propylene and higher olefins have recently been developed that show great promise in the plastics industry and the many other applications of thermoplastic materials. However, these hydrocarbon polymers, and particularly the isotactic polymers such as isotactic polypropylene, when mechanically worked, as, for example, in extruding, molding, etc., processes are subject to considerable degradation at the high temperatures required for processing. Degradation also occurs on exposure of the finished article to heat and light as may be encountered in use as, for example, when polypropylene is used for plastic hot water or steam pipes.

Now in accordance with this invention it has been found that polymers of propylene and higher α-olefins may be stabilized against heat and light degradation by incorporating in the polymer composition a small amount of at least one of the group of dialkyl-2(2'-hydroxyphenyl) - 2,4,4 - trimethylchromans, dialkyl-4(2'-hydroxyphenyl)-2,2,4-trimethylchromans and alkylidene-bis(alkylphenol)s, in combination with a small amount of a dialkyl ester of thiodipropionic acid. While each of these additives when used alone may increase the stability of polypropylene and the higher polyolefins to heat, the combination of these two stabilizers is synergistic in its effect and increases the stability of the polymer to heat far in excess of the additive effect of the two ingredients and in fact to a most outstanding degree.

Any polymer of an olefin containing three or more carbon atoms may be stabilized in accordance with this invention by the addition of one of these 2(or 4)-2'-hydroxyphenyl)chromans or bisphenols in combination with a dialkyl ester of thiodipropionic acid. Particularly outstanding results are achieved in the case of isotactic polypropylene and higher polymers as, for example, poly-(butene - 1), polyisobutylene, poly(pentene-1), poly(3-methylbutene-1), poly(4-methylpentene-1), etc. Copolymers of such olefins, as, for example, ethylene-propylene copolymers, may likewise be stabilized by the process of this invention.

As pointed out above, a synergistic effect in the stabilization of these polymers with a combination of a 2(or 4)- (2'-hydroxyphenyl)chroman or bisphenol and an ester of thiodipropionic acid is obtained that was entirely unexpected, particularly with these crystalline, isotactic polymers. In fact, such outstanding stability is attained that it makes it possible to use such polymers as isotactic polypropylene for many applications that previously had not been possible, as, for example, as hot water or steam pipes, etc.

The stabilizers that are used in accordance with this invention in combination with the esters of thiodipropionic acid are 2(or 4)-(2'-hydroxyphenyl)chromans and bisphenols. The 2(or 4)-(2'-hydroxyphenyl)chromans that may be used are those which have one of the following general formulae:

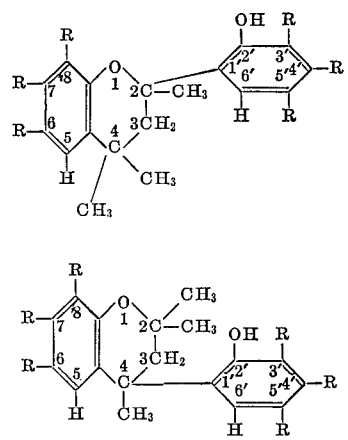

or where each R may be hydrogen or alkyl, but at least one R in each of the aromatic rings is alkyl. These compounds may also be named as benzopyrans. Thus the 2-(2'-hydroxyphenyl)chromans may be named as 2,3-dihydro-2(2'-hydroxyphenyl)-1,4-benzopyrans or 3,4-dihydro-2(2'-hydroxyphenyl)-1,2-benzopyrans and the 4-(2'-hydroxyphenyl)chromans may be named as 2,3-dihydro-4(2'-hydroxyphenyl) - 1,4-benzopyrans or 3,4-dihydro-4(2'-hydroxyphenyl)-1,2-benzopyrans. The 2(2'-hydroxyphenyl)-chromans are also sometimes named as flavans, i.e. 2'-hydroxyflavans. The alkyl substituents in each of the aromatic rings may be any alkyl radical, as, for example, methyl, ethyl, propyl, isopropyl, butyl, isobutyl, tert-butyl, amyl, hexyl, isohexyl, octyl, isooctyl, 2-ethylhexyl, nonyl, isononyl, decyl, undecyl, dodecyl, etc. Preferably, at least one alkyl radical in each aromatic ring will contain at least four carbon atoms or the sum of the carbon atoms in the alkyl radicals in each ring will be at least four.

Exemplary of these 2(or 4)-(2'-hydroxyphenyl)chromans that may be used in combination with the esters of thiodipropionic acid are
2(2'-hydroxyphenyl)-2,4,4,5',6-pentamethylchroman,
4(2'hydroxyphenyl)-2,2,4,5',6-pentamethylchroman,
2(2'-hydroxyphenyl)-5'6-diisopropyl-2,4,4,-trimethylchroman,
2(2'-hydroxyphenyl)-5'6-diisopropyl-2,4,4,3',8-pentamethylchroman,
2(2'-hydroxyphenyl)-5'6-di-tert-butyl-2,4,4-trimethylchroman,
4(2'-hydroxyphenyl)-5'6-di-tert-butyl-2,2,4-trimethylchroman,
2(2'-hydroxyphenyl)-5',6-diocytyl-2,4,4-trimethylchroman,
2(2'-hydroxyphenyl)-5',6-dinonyl-2,4,4-trimethylchroman,
4(2'-hydroxyphenyl)-5'6-dinonyl-2,2,4-trimethylchroman,
2(2'-hydroxyphenyl)-5',6-didecyl-2,4,4-trimethylchroman, etc.

The alkylidene-bis-(alkylphenol)s that may be used have one of the following general formulae:

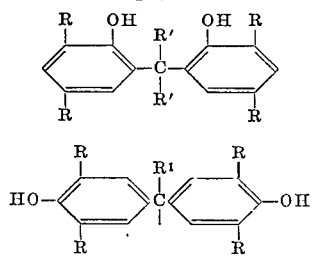

where each R may be hydrogen or alkyl, but at least one R in each of the aromatic rings is alkyl and the alkyl substituent may be any alkyl radical as set forth above for the (2'-hydroxyphenyl)-chroman structures and where each R' may be hydrogen or a lower alkyl as, for example, methyl or ethyl. Exemplary of these alkylidene-bis-(alkylphenol)s that may be used are
2,2'-methylene-bis-(4-methyl-6-isopropylphenol),
2,2'methylene-bis-(4-methyl-6-tert-butylphenol),
2,2'-methylene-bis-(4-tert-butyl-6-methylphenol),
2,2'-methylene-bis-(4,6-di-tert-butylphenol),
2,2'-methylene-bis-(4-nonylphenol),
2,2'-methylene-bis-(4-decylphenol),
4,4'-methylene-bis-(2,6-ditert-butylphenol),
4,4'-methylene-bis-(2-methyl-6-tert-butylphenol),
2,2'-ethylidene-bis-(4-methyl-6-tert-butylphenol),
2,2'-ethylidene-bis-(4,6-ditert-butylphenol),
2,2'-ethylidene-bis-(4-octylphenol),
2,2'-ethylidene-bis-(4-nonylphenol),
2,2'-isopropylidene-bis-(4-methyl-6-isopropylphenol),
2,2'-isopropylidene-bis-(4-isopropylphenol),
2,2'-isopropylidene-bis-(4-isopropyl-6-methylphenol),
2,2'-isopropylidene-bis-(4-methyl-6-tert-butylphenol),
2,2'-isopropylidene-bis-(4-octylphenol),
2,2'-isopropylidene-bis-(4-nonylphenol),
2,2'-isopropylidene-bis-(4-decylphenol),
2,2'-isobutylidene-bis(4-methyl-6-tert-butylphenol),
2,2'-isobutylidene-bis-(4-nonylphenol), etc.

These alkylidene-bis-(alkylphenol)s are prepared by any of the well-known procedures of the prior art. Usually, they are prepared by reacting an alkylphenol with formaldehyde, acetaldehyde, acetone, or methyl ethyl ketone, etc. in the presence of a strong acid such as hydrochloric acid, etc. In a similar fashion the 2-(2'-hydroxyphenyl)chromans are prepared by reacting an alkylphenol with acetone and the 4-(2'-hydroxyphenyl)chromans are prepared by reacting an alkylphenol with mesityl oxide. Thus, in many of these reactions a mixture of alkylidene-bis-(alkylphenol)s and (2'-hydroxyphenyl)chromans is obtained as, for example, when acetone is condensed or reacted with an alkylphenol the reaction product may be a 2-(2'hydroxyphenyl)chroman or an isopropylidene-bis-(alkylphenol) depending on the reaction conditions or the reaction product may be a mixture of these two types of compounds. In such cases the individual compounds need not be isolated but instead the reaction product may be used with excellent results.

Any dialkyl ester of dithiopropionic acid may be used in combination with the 2(or 4)-(2'-hydroxyphenyl) chromans or alkylidene-bis-(alkylphenol)s to obtain the outstanding stabilization of polypropylene and the higher polyolefins in accordance with this invention. Exemplary of these esters are the dimethyl, diethyl, dibutyl, bis(3,3,5-trimethylhexyl), didecyl, dilauryl, dihexadecyl, distearyl, etc. esters of dithiopropionic acid.

The amount of the two stabilizers incorporated in the polyolefin may be varied from a very small stabilizing amount up to several percent, but outstanding results have been obtained when from about 0.01% to about 5% and preferably from about 0.05% to about 1.0% of the chroman or bisphenol is used in combination with from about 0.01% to about 5.0% and preferably from about 0.05% to about 2.0% of the dialkyl ester of thiodipropionic acid based on the weight of polymer.

The two stabilizers used in accordance with this invention may be admixed with the polyolefin by any of the usual procedures for incorporating an antioxidant in a solid material. A simple method is to dissolve the antioxidants in a low-boiling solvent such as acetone and, after thoroughly mixing the solution with the polymer in flake or other such form, evaporating the solvent or they may be incorporated by various means of mechanical mixing, etc.

The stabilizing combination of this invention may be used in combination with other stabilizers such as ultraviolet light absorbers, antiacids such as calcium soaps, or other anti-oxidants. Other materials may also be incorporated in the polymer as, for example, pigments, dyes, fillers, etc.

The following examples will illustrate the tremendous stabilization that is obtained when a polyolefin is stabilized in accordance with this invention.

Example 1

The alkylphenol-acetone condensation product used in this example was prepared by condensing a technical nonylphenol with acetone by saturating the mixture with anhydrous hydrogen chloride at 60° C. and holding at that temperature for 70 hours. The technical nonylphenol used was a mixture of alkylphenols containing approximately 28% nonyl-, 9% undecyl-, 30% dodecyl-, and 16% tridecylphenol with small amounts of other alkylphenols in which the alkyl radical varied from $C_8$ to $C_{18}$, the alkyl substituents being chiefly in the para-position and made up of straight- and branched-chain alkyl groups. The crude reaction mixture was distilled but the individual condensation products were not isolated. This distilled reaction product contained about 23% of the 2(2'-hydroxyphenyl) - 2,4,4 - trimethyl - 5',6 - dinonylchroman and about 34% of the 2,2'-isopropylidene-bis-(4-nonylphenol).

The effectiveness of combining the above nonylphenol-acetone condensation reaction product (NP–A–RP) with the dilauryl ester of thiodipropionic acid (LTDPA) for the stabilization of polypropylene is shown in Table I below, in comparison with each of these stabilizers alone. As may be seen from this data the nonylphenol-acetone condensation reaction product combined with the dilauryl ester of thiodipropionic acid exhibits an amazing degree of synergism and results in an outstandingly stabilized polypropylene composition.

In each of the tests a crystalline polypropylene having a melting point of about 165° C. and a reduced specific viscosity of 16.1 was thoroughly mixed with a solution of the given amount of antioxidant dissolved in acetone, after which the acetone was evaporated by heating in a vacuum oven at 70° C. for about one hour. The dry mix was extruded into molding powder at 260° C. and the molding powder then pressed into sheets 20 mils thick. Strips cut from these sheets, and 0.5 inch wide, were hung in one oven at 110° C. and another at 133° C. Other strips, of the same size, were fastened on white cards and placed in the FadeOmeter. At 24-hour intervals the strips were tested for development of brittleness by bending and by visual observation of degradation, such as granulation. The embrittlement times for each sample are set forth in Table I.

Example 2

Example 1 was repeated except that in this case the reaction product of nonylphenol and mesityl oxide (NP–MO–RP) was used in combination with dilauryl thiodipropionate (LTDPA) and the polypropylene used had a reduced specific viscosity of 8.9. The embrittlement times for each sample are set forth in Table I.

Example 3

In this example, strips were prepared and tested as described in Example 1 using polypropylene (RSV 16.1) containing the same nonylphenol-acetone condensation reaction product and dilauryl ester of thiodipropionic acid as in that example, but additionally containing calcium stearate and/or tris(2-ethylhexyl)phosphite. The embrittlement times for each sample are set forth in Table I.

TABLE I

| | Percent Conc. | Percent Conc. LTDPA | Embrittlement Time Hrs. 133° C. | Embrittlement Time Days 110° C. | Fade-Ometer Life in Hours |
|---|---|---|---|---|---|
| Example 1. NP-A-RP | | 0.5 | 72 | 26 | 48 |
| | 0.5 | | 72 | 25 | 72 |
| | 0.5 | 0.5 | 1,350 | >125 | 72 |
| Example 2. NP-MO-RP | | 0.5 | 72 | 26 | 48 |
| | 0.5 | | 24 | 12 | 96 |
| | 0.5 | 0.5 | 720 | >55 | 72 |
| Example 3. NP-A-RP: | | | | | |
| Plus 0.4% CaStearate | 0.5 | | 72 | 42 | 72 |
| Do | 0.5 | 0.5 | 1,420 | >105 | 72 |
| Plus 0.2% Phosphite | 0.5 | 0.5 | 2,048 | >105 | 72 |
| (Plus 0.4% CaStearate) (Plus 0.2% Phosphite) | 0.5 | 0.5 | 2,192 | >105 | 72 |

Example 4

In this example strips of polypropylene (RSV of 12.0) were prepared and tested as described in Example 1 but using varying proportions of the nonylphenol-acetone condensation reaction product and the dilauryl ester of thiodipropionic acid. The concentration of each and the embrittlement times for each sample are tabulated below in Table II.

TABLE II

| Percent Conc. NP-A-RP | Percent Conc. LTDPA | Embrittlement Time Hrs. 133 C. | Embrittlement Time Days 110° C. | Fade-Ometer Life in Hours |
|---|---|---|---|---|
| 0.25 | 0.25 | 288 | >75 | 72 |
| 0.25 | 0.5 | 468 | >75 | 72 |
| 0.25 | 1.0 | >1,840 | >75 | 72 |
| 0.5 | 0.1 | 216 | >75 | 48 |
| 0.5 | 0.25 | 840 | >75 | 72 |
| 0.5 | 0.5 | 1,600 | >75 | 96 |
| 0.5 | 1.0 | 2,048 | >75 | 72 |
| 1.0 | 0.5 | 870 | >75 | 96 |

Examples 5-8

Strips of polypropylene (RSV of 8.9) were prepared as described in Example 1 but containing various (hydroxyphenyl)-chromans or bisphenols in combination with the dilauryl ester of thiodipropionic acid. In Example 5 a combination of 0.5% of 2(2'-hydroxyphenyl)-2,4,4-trimethyl-5',6-dinonylchroman is used in combination with the dilauryl ester of thiodipropionic acid. In Example 6 a combination of 0.5% of 4(2'-hydroxyphenyl)-2,2,4-trimethyl-5',6-dinonylchroman, in Example 7 0.5% of 2,2'-isopropylidene-bis-(4-methyl-6-tert-butylphenol), and in Example 8, 0.5% of 2,2'-isopropylidene-bis-(4-nonylphenol) was used in combination with the said luaryl ester. The embrittlement times for each sample are set forth in Table III below.

TABLE III

| Example No. | | Percent Conc. | Percent Conc. LTDPA | Embrittlement Time in Hours at 133° C. | Fade-Ometer Life in Hours |
|---|---|---|---|---|---|
| | Control | | 0.5 | 72 | 48 |
| 5 | 2(2'-hydroxyphenyl)-2,4,4-trimethyl-5',6-dinonylchroman | 0.5 | | 72 | 120 |
| | | 0.5 | 0.5 | >1,000 | 144 |
| 6 | 4(2'-hydroxyphenyl)-2,2,4-trimethyl-5',6-dinonylchroman | 0.5 | | 72 | 48 |
| | | 0.5 | 0.5 | >750 | 72 |
| 7 | 2,2'-isopropylidene-bis-(4-methyl-6-tert-butylphenol) | 0.5 | | 72 | 72 |
| | | 0.5 | 0.5 | 522 | 72 |
| 8 | 2,2'-isopropylidene-bis-(4-nonylphenol) | 0.5 | | 48 | 96 |
| | | 0.5 | 0.5 | >1,000 | 96 |

Examples 9-11

Strips of polypropylene (RSV of 10.3) were prepared as described in Example 1 but using various esters of thiodipropionic acid in combination with the nonylphenol-acetone condensation reaction product described in that example. The esters used were di butyl in Example 9, the di n-decyl in Example 10 and the di-stearyl in Example 11. The embrittlement times for each sample are set forth in Table IV.

TABLE IV

| Example | TDPA Ester | Percent Conc. | Percent Conc. NP-A-RP | Embrittlement Time in Hours at 133° C. |
|---|---|---|---|---|
| | | | 0.5 | 72 |
| 9 | Butyl | 0.5 | | 24 |
| | | 0.5 | 0.5 | >300 |
| | | | 0.5 | 72 |
| 10 | Decyl | 0.5 | | 24 |
| | | 0.5 | 0.5 | >300 |
| | | | 0.5 | 72 |
| 11 | Stearyl | 0.5 | | 72 |
| | | 0.5 | 0.5 | >300 |

Examples 12 and 13

In these examples a polypropylene of RSV of 10.3 and a propylene-ethylene copolymer (containing about 2% ethylene, RSV of 12.6 and melting point of 164° C.) were stabilized according to the procedure described in Example 1 with the same nonylphenol-acetone condensation reaction product and the dilauryl ester of thiodipropionic acid. However, in this case, after incorporaitng the two stabilizers, the dry mix was pressure molded into sheets 20 mils thick, the intermediate step of extruding the mix into molding power before pressing into sheets being omitted. Strips cut from these sheets were then tested for embrittlement as before. The embrittlement times for each sample are set forth in Table V.

TABLE V

| Example | | Percent Conc. NP-A-RP | Percent Conc. LTDPA | Embrittlement Time in Hours at 133°C. | Fade-Ometer Life in Hours |
|---|---|---|---|---|---|
| 12 | Polypropylene | 0.5 | | 72 | 96 |
| | | | 0.5 | 400 | 96 |
| | | 0.5 | 0.5 | >700 | 96 |
| 13 | Propylene-Ethylene Copolymer | 0.5 | | 72 | 96 |
| | | | 0.5 | 400 | 120 |
| | | 0.5 | 0.5 | >700 | 120 |

The foregoing examples clearly demonstrate the surprisingly superior results that are obtained when polyolefins are stabilized with a combination of a (hydroxyphenyl)chroman and/or an alkylidene alkyl substituted bisphenol with a dialkyl ester of thiodipropionic acid. Percentages of stabilizing components in the appended claims are based on the weight of polymer.

What I claim and desire to protect by Letters Patent is:

1. A stabilized polyolefin comprising a solid polymer of a mono-olefin containing at least 3 carbon atoms, and as a stabilizer therefor from 0.01 to 5% of a dialkyl ester of thiodipropionic acid in which each alkyl radical is of 1 to 18 carbon atoms in combination with from 0.01 to 5% of a 2(2'-hydroxyphenyl)-2,4,4-trimethylchroman in which each aromatic ring is substituted by from 1 to 3 alkyl radicals of 1 to 12 carbon atoms.

2. A stabilized polyolefin comprising a solid polymer of a mono-olefin containing at least 3 carbon atoms, and as a stabilizer therefor from 0.01 to 5% of a dialkyl ester of thiodipropionic acid in which each alkyl radical is of 1 to 18 carbon atoms in combination with from 0.01 to 5% of a 4(2'-hydroxyphenyl)-2,2,4-trimethylchroman in which each aromatic ring is substituted by from 1 to 3 alkyl radicals of 1 to 12 carbon atoms.

3. A stabilized polyolefin comprising a solid polymer of a mono-olefin containing at least 3 carbon atoms, and as a stabilizer therefor from 0.01 to 5% of a dialkyl ester of thiodipropionic acid in which each alkyl radical is of 1 to 18 carbon atoms in combination with from 0.01 to 5% of an alkylidene-bis-(alkylphenol) in which the alkylidene radical contains from 1 to 5 carbon atoms and in which each aromatic ring is substituted by from 1 to 2 alkyl radicals of 1 to 12 carbon atoms.

4. A stabilized polyolefin comprising a solid polymer of a mono-olefin containing at least 3 carbon atoms, and as a stabilizer therefor from 0.01 to 5% of a dialkyl ester of thiodipropionic acid in which each alkyl radical is of 1 to 18 carbon atoms in combination with from 0.01 to 5% of 2(2'-hydroxyphenyl)-2,4,4-trimethyl-5',6-dinonylchroman.

5. A stabilized polyolefin comprising a solid polymer of a mono-olefin containing at least 3 carbon atoms, and as a stabilizer therefor from 0.01 to 5% of a dialkyl ester of thiodipropionic acid in which each alkyl radical is of 1 to 18 carbon atoms in combination with from 0.01 to 5% of 4(2'-hydroxyphenyl)-2,2,4-trimethyl-5',6-dinonylchroman.

6. A stabilized polyolefin comprising a solid polymer of a mono-olefin containing at least 3 carbon atoms, and as a stabilizer therefor from 0.01 to 5% of a dialkyl ester of thiodipropionic acid in which each alkyl radical is of 1 to 18 carbon atoms in combination with from 0.01 to 5% of 2,2'-isopropylidene-bis-(4-nonylphenol).

7. A stabilized polyolefin comprising a solid polymer of a mono-olefin containing at least 3 carbon atoms, and as a stabilizer therefor from 0.01 to 5% of a dialkyl ester of thiodipropionic acid in which each alkyl radical is of 1 to 18 carbon atoms in combination with from 0.01 to 5% of the reaction product of nonylphenol and acetone.

8. A stabilized polyolefin comprising a solid polymer of a mono-olefin containing at least 3 carbon atoms, and as a stabilizer therefor from 0.01 to 5% of a dilauryl ester of thiodipropionic acid in combination with from 0.01 to 5% of 2(2'-hydroxyphenyl)-2,4,4-trimethyl-5',6-dinonylchroman.

9. A stabilized polyolefin comprising a solid polymer of a mono-olefin containing at least 3 carbon atoms, and as a stabilizer therefor from 0.01 to 5% of a dilauryl ester of thiodipropionic acid in combination with from 0.01 to 5% of 4(2'-hydroxyphenyl)-2,2,4-trimethyl-5',6-dinonylchroman.

10. A stabilized polyolefin comprising a solid polymer of a mono-olefin containing at least 3 carbon atoms, and as a stabilizer therefor from 0.01 to 5% of a dilauryl ester of thiodipropionic acid in combination with from 0.01 to 5% of 2,2'-isopropylidene-bis-(4-nonylphenol).

11. A stabilized polyolefin comprising a solid polymer of a mono-olefin containing at least 3 carbon atoms, and as a stabilizer therefor from 0.01 to 5% of a dilauryl ester of thiodipropionic acid in combination with from 0.01 to 5% of the reaction product of nonylphenol and acetone.

12. A stabilized polyolefin comprising a solid polymer of a mono-olefin containing at least 3 carbon atoms and, as a stabilizer therefor, from 0.01 to 5% of a dialkyl ester of thiodipropionic acid in which each alkyl radical is of 1 to 18 carbon atoms in combination with from 0.01 to 5% of at least one compound of the group consisting of alkylidene-bis(alkylphenol)s in which the alkylidene radical contains from 1 to 5 carbon atoms and in which each aromatic ring is substituted by from 1 to 2 alkyl radicals of 1 to 12 carbon atoms, and 2(2'-hydroxyphenyl)-2,4,4-trimethylchromans and 4(2'-hydroxyphenyl)-2,2,4-trimethylchromans, in which each aromatic ring of each of said chromans is substituted by from 1 to 3 alkyl radicals of 1 to 12 carbon atoms.

13. Solid polypropylene containing, as a stabilizer therefor, from 0.01 to 5% of a dialkyl ester of thiodipropionic acid in which each alkyl radical is of 1 to 18 carbon atoms in combination with from 0.01 to 5% of at least one compound of the group consisting of alkylidene-bias-(alkylphenol)s in which the alkylidene radical contains from 1 to 5 carbon atoms and in which each aromatic ring is substituted by from 1 to 2 alkyl radicals of 1 to 12 carbon atoms, and 2(2'-hydroxyphenyl)-2,4,4-trimethylchromans and 4(2'-hydroxyphenyl)-2,2,4-trimethylchromans, in which each aromatic ring of each of said chromans is substituted by from 1 to 3 alkyl radicals of 1 to 12 carbon atoms.

14. The composition of claim 13 additionally containing 0.4% of calcium stearate.

15. Solid polypropylene containing, as a stabilizer therefor, from 0.1 to 5% of dilauryl thiodipropionate in combination with from 0.01 to 5% of 4(2'-hydroxyphenyl)-2,2,4-trimethyl-5',6-dinonylchroman.

16. Solid polypropylene containing, as a stabilizer therefor, from 0.01 to 5% of dilauryl thiodipropionate in combination with from 0.01 to 5% of 2,2'-isopropylidene-bis-(4-nonylphenol).

17. Solid polypropylene containing, as a stabilizer therefor, from 0.01 to 5% of dilauryl thiodipropionate in combination with the reaction product of nonylphenol and acetone.

18. A stabilized isotactic polypropylene, and as a stabilizer therefor from 0.01 to 2% of a dialkyl ester of thiodipropionic acid in which each alkyl radical is of 6 to 18 carbon atoms in combination with from 0.01 to 2% of an alkylidene-bis(alkylphenol) in which the alkylidene radical contains from 1 to 3 carbon atoms and in which each aromatic ring is substituted by from 1 to 2 alkyl radicals of 1 to 12 carbon atoms.

19. A stabilized isotactic polypropylene, and as a stabilizer therefor from 0.01 to 2% of a dialkyl ester of thiodipropionic acid in which each alkyl radical is of 6 to 18 carbon atoms in combination with from 0.01 to 2% of an alkylidene-bis (alkylphenol) in which the alkylidene radical contains from 1 to 3 carbon atoms and in which each aromatic ring is substituted by from 1 to 2 alkyl radicals of 1 to 4 carbon atoms.

References Cited

UNITED STATES PATENTS

| | | | |
|---|---|---|---|
| 2,519,755 | 8/1950 | Gribbens | 260—45.85 |
| 2,535,058 | 12/1950 | Gleim et al. | 260—45.8 |
| 2,568,902 | 9/1951 | Thompson et al. | 260—45.85 |
| 2,664,378 | 12/1953 | Heller | 260—45.85 |
| 2,745,726 | 5/1956 | Young et al. | 260—45.95 |

FOREIGN PATENTS 701,468  12/1953  Great Britain.

HOSEA E. TAYLOR, Jr, Primary Examiner

U.S. Cl. X.R.

260—45.7, 45.8, 45.85, 45.95

PO-1050
(5/69)

UNITED STATES PATENT OFFICE
CERTIFICATE OF CORRECTION

Patent No. 3,471,427   Dated October 7, 1969

Inventor(s) David M. Dickson

It is certified that error appears in the above-identified patent and that said Letters Patent are hereby corrected as shown below:

Col. 3, line 69 of printed patent; page 6, line 11 of spec. "dithiopropionic acid" should be "thiodipropionic acid"

Claim 13, line 6 of printed patent; Claim 13, line 5 of spec. "bias-(alkylphenol)s" should be "bis-(alkylphenol)s"

SIGNED AND
SEALED
JAN 27 1970

(SEAL)
Attest:

Edward M. Fletcher, Jr.
Attesting Officer

WILLIAM E. SCHUYLER, JR.
Commissioner of Patents